United States Patent
Briggs

[15] 3,652,850
[45] Mar. 28, 1972

[54] MEASUREMENT OF OPTICAL DENSITY

[72] Inventor: Ronald Briggs, Stevenage, England
[73] Assignee: National Research Development Corporation, London, England
[22] Filed: Mar. 6, 1970
[21] Appl. No.: 17,223

[30] Foreign Application Priority Data

May 22, 1969 Great Britain.....................26,287/69

[52] U.S. Cl.....................250/43.5 R, 250/43.5 D, 250/218, 250/220 C, 250/222 PC, 356/104, 356/206, 356/208
[51] Int. Cl.....................................................G01n 21/26
[58] Field of Search............250/43.5 D, 43.5 R, 218, 220 C, 250/222 PC; 356/204, 205, 206, 208, 103, 104

[56] References Cited

UNITED STATES PATENTS

| | | | |
|---|---|---|---|
| 2,316,239 | 4/1943 | Hare | 250/43.5 D |
| 3,487,069 | 12/1969 | Maselli | 250/218 |

Primary Examiner—Archie R. Borchelt
Assistant Examiner—C. E. Church
Attorney—Cushman, Darby & Cushman

[57] ABSTRACT

Method and apparatus for determining the optical density for radiation within a predetermined range of wavelengths in which a first signal is produced related to the attenuation of radiation over a known path length in the fluid, a second signal is produced related to the attenuation of the radiation over the same path length by solid matter suspended in the fluid and the second signal is utilized to correct the first signal for the presence of the suspended solid matter in the fluid.

21 Claims, 6 Drawing Figures

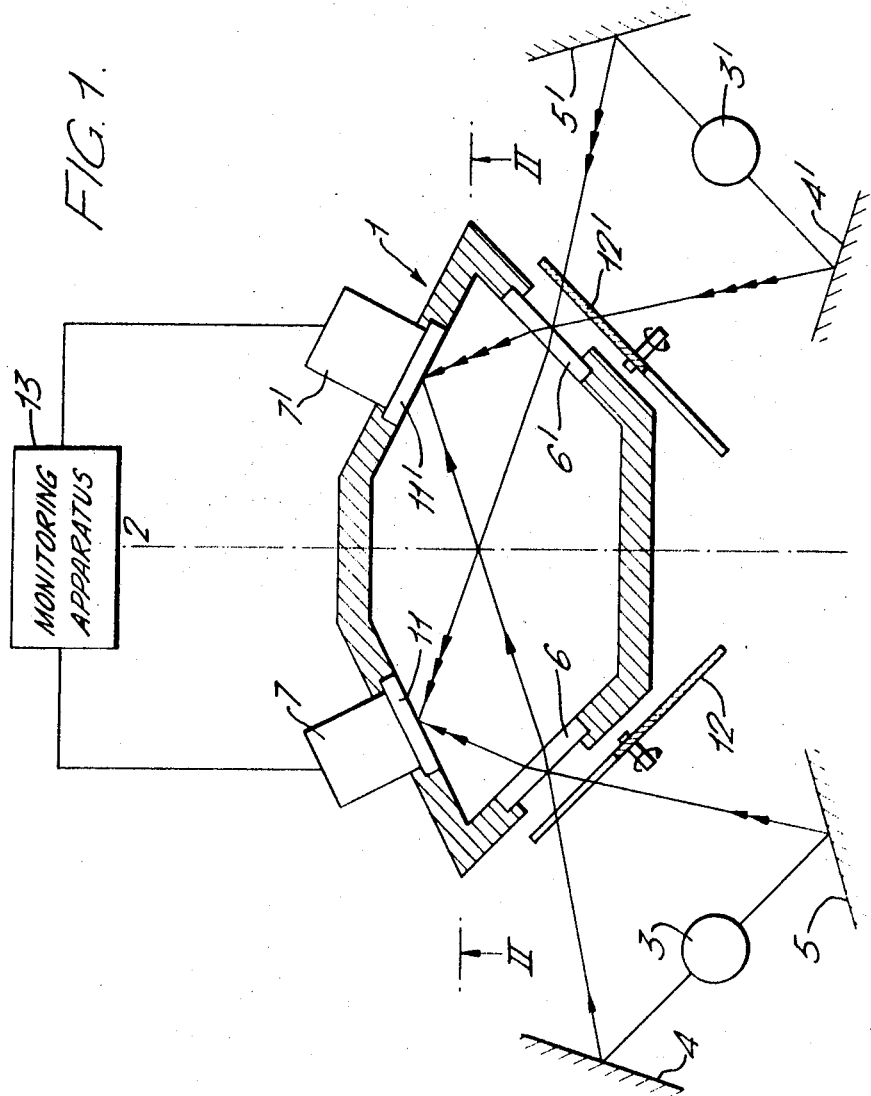

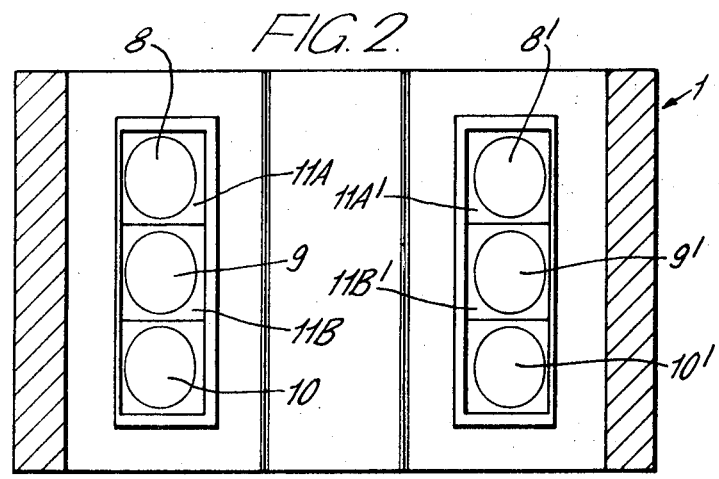
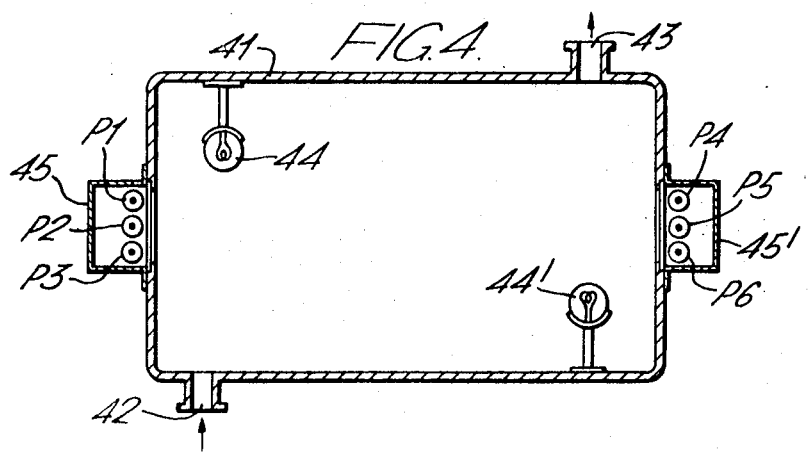
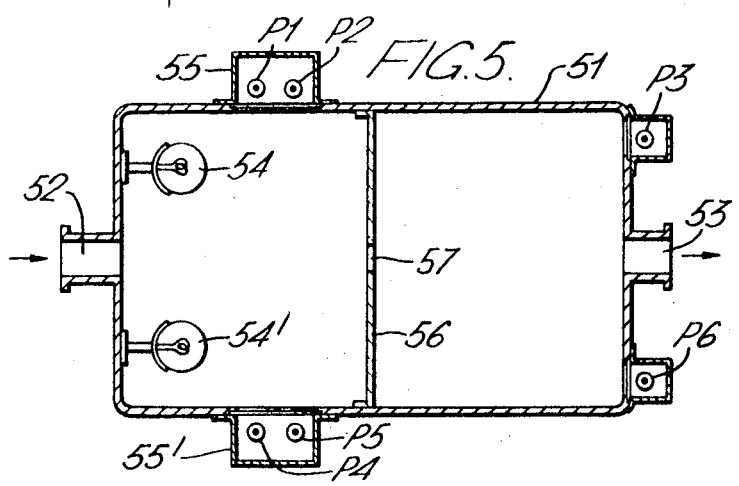

MEASUREMENT OF OPTICAL DENSITY

The invention relates to the measurement of the optical density of fluids and more particularly to the measurement of the optical density of a liquid to provide analytical information about the liquid.

It is known that the presence of dissolved substances in a liquid gives rise to the attenuation of a beam of light passing through the liquid and that the attenuation occurs selectively at differing wavelengths which are characteristic of different solutes. Hence by measuring the attenuation of the light, that is the optical density of the liquid, at specific wavelengths, the concentration of the solutes can be measured, thus providing a method of analyzing the liquid. However, suspended solid matter also gives rise to the attenuation of the light passing through the liquid, but in this case the attenuation occurs generally over most of the optical spectrum due to the absorption, scattering or reflection of incident light by the particles of the suspended solids. Therefore, there will be an error introduced in the apparent concentrations of the solutes, by the overall attenuation due to the solid matter suspended in the liquid.

For the purpose of this specification the term 'light' is intended to include both the ultraviolet and infra-red regions of the spectrum and the term 'optical density' is to be read accordingly.

For example, organic matter dissolved in river water or effluents gives rise to an absorption of light having wavelengths in the range 2,000 to 2,800 A. and nitrates and nitrate ions cause absorption in the range 2,000 to 2,400 A. Therefore by measuring the attenuation of a beam of light passing through a sample of such water at these wavelengths it is possible to determine the concentration of the organic matter, nitrates and nitrate ions dissolved in the water.

The error introduced by the presence of suspended solid matter in this case is likely to be appreciable as considerable quantities of suspended solid matter are usually present in river water or effluents.

It is an object of the present invention in one aspect to provide an improved method of measuring the optical density of a fluid and it is an object of the invention in another aspect to provide an improved apparatus for measuring optical density of the fluid.

According to the invention there is provided a method of measuring the optical density of a fluid for light having wavelengths in a specific region of the electromagnetic spectrum comprising the operations of deriving a first signal related to the attenuation of the light, deriving a second signal related to the concentration of solid matter suspended in the fluid, and utilizing the second signal to correct the first signal for attenuation of the light by the suspended solid matter and thereby to provide an output signal indicative of the optical density of the fluid.

Preferably the method includes the operation of directing beams of the light along longer and shorter paths through the fluid to first and second detecting means, causing each of the detecting means alternately to receive light which has travelled along the longer or shorter path and deriving from signals generated by the detecting means a signal related to the amount of light received by each of the detectors via the longer and shorter paths to provide said first signal.

Also according to the invention there is provided apparatus for measuring the optical density of a fluid for light having wavelengths in a specific region of the electromagnetic spectrum comprising means for deriving a first signal related to the attenuation of the light, means for deriving a second signal related to the concentration of solid matter suspended in the fluid, means for utilizing the second signal to correct the first signal for attenuation of the radiation by the said suspended solid matter and thereby provide an output signal indicative of the optical density of the fluid.

Preferably the apparatus includes means for directing beams of the light along longer and shorter paths through a sample of the fluid to first and second detecting means, means for causing each of the detecting means alternately to receive light which has travelled along the longer and shorter paths through the fluid and means for generating a signal related to the ratio of the intensity of the radiation received by each of the detecting means via the longer path to the intensity of the radiation received via the shorter path to provide signal related to the attenuation of the radiation when travelling through the fluid which in addition is relatively insensitive to variations in the incident radiation and detector characteristics.

Furthermore, the arrangement preferably is such that when one detecting means is receiving light which has travelled over the longer path, simultaneously the other is receiving light which has travelled over the shorter path and for each detecting means the total radiation received via each of the said paths in a given time interval, is utilized to provide the signal related to the attenuation of the radiation. By this means, the effects of changes in the optical conditions in each of the light paths is reduced to a minimum.

Embodiments of the invention will be described, by way of example, with reference to the accompanying drawings, in which:

FIG. 1 is a cross section of part of an apparatus embodying the invention;

FIG. 2 is a vertical section along the line II — II of the part of the apparatus shown in FIG. 1.

FIG. 4 shows diagrammatically part of a second apparatus embodying the invention;

FIG. 5 shows diagrammatically a part of a third apparatus embodying the invention.

Figure 3:
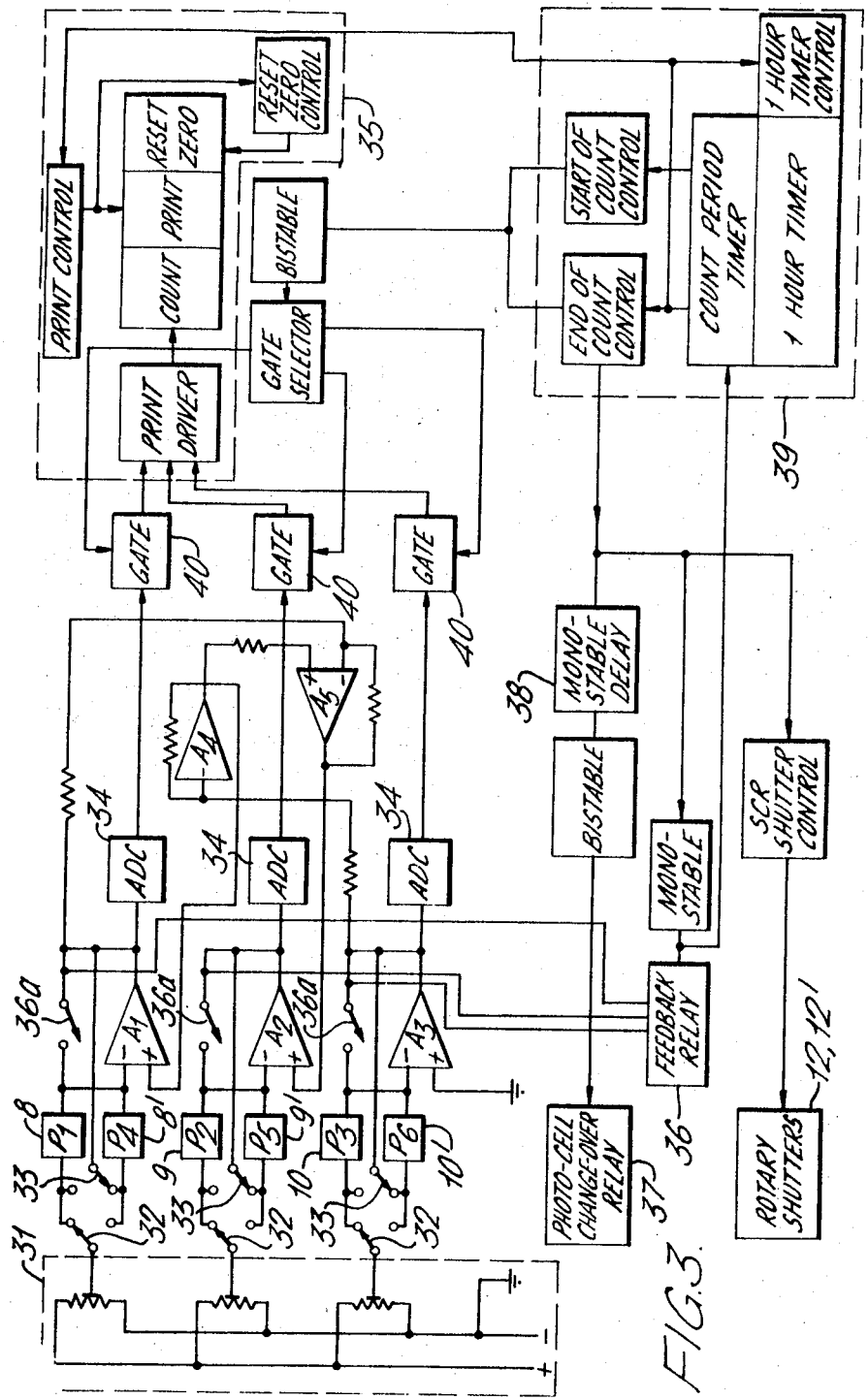
FIG. 3 is a circuit diagram of a monitoring apparatus associated with the embodiment of FIG. 1.

Referring to FIGS. 1 and 2, a cell 1 is in the form of a pentagon that is symmetrical about an axis 2, and in use is so arranged that a sample liquid can flow through the cell 1. Light from a source 3 falls upon two front-surfaced mirrors 4 and 5 and is reflected into the cell 1 through a quartz window 6 to travel via two separate paths to fall upon a first and a second detector 7 and 7' respectively. Each of the detectors includes three photoelectric cells 8, 9 and 10, 8', 9' and 10', respectively, disposed above one another. In front of the photocells 8, 8' (P1, P4) and 9, 9' (P2, P5) are filters, 11 and 11 respectively, which have regions 11A and 11B that are sensitive selectively to light having wavelengths in the regions 2,200 to 2,800 A to 2,400 A, thus rendering the respective photocells sensitive to these ranges of wavelengths. The third pair of photocells 10 and 10' (P3, P6) is arranged to be generally sensitive over the optical region of the electromagnetic spectrum.

The three pairs of photocells 8, 8'; 9, 9'; and 10, 10' provide three sets, or channels, for signals, the first being indicative of the concentration of organic matter in the sample, the second being indicative of the concentration of nitrates, or nitrate ion and carbon in the sample and the third being indicative of the amount of suspended solid matter in the sample.

A second light source 3' is positioned symmetrically with respect to the axis 2 and the first light source 3', and light from this second source 3 is reflected from mirrors 4', 5' that are similar to the mirrors 4 and 5 into the cell 1 through a quartz window 6' to travel via two paths having lengths respectively corresponding to the paths traversed by light from the source 3, thus each detector 7 and 7' receives light that has travelled along a shorter path and also light that has travelled along a longer path.

Shutters 12 and 12' cause the detectors 7 and 7' alternately to receive light from the first light source 3 or the second light source 3'. Each detector in turn receives light from one source that has travelled along the shorter path and light from the other source that has travelled along the longer path. By making each photoelectric cell perform alternately the task of short path detector and long path detector, a degree of compensation for uneven or changing optical conditions in each of the light paths is accomplished.

Such uneven or changing conditions, for example, may be due to variations in the outputs of the light sources, variations in the sensitivities of the photocells or fouling of the optical surfaces within the cell by growths or deposits.

The two resultant outputs from each photocell are applied to a monitoring apparatus shown generally at 13 in FIG. 1, and in more detail in FIG. 3.

Referring to FIG. 3, each of the photocells is driven by a source of potential, shown generally as 31. Switches 32 enable the potential from the source 31 to be applied only to those photocells which are operative at any moment. As has been stated the basis of each measurement is a comparison of the attenuation of a beam of light directed through two different path lengths within the sample cell 1. The comparison is achieved by arranging for each of the photocells in two respective light paths to act as input and feedback resistive components in an associated operational amplifier, designated $A_1$, $A_2$ or $A_3$. Changeover switches 33, which are worked in synchronism with the potential supply switches 21, enable the function of each of the pairs of photocells 8, 8'; 9, 9' or 10, 10' to be interchanged.

The gains of the amplifiers, and hence the output voltages will be functions of the relative intensities of the light incident upon the respective photocells.

The output voltage of each of the operational amplifiers $A_1$, $A_2$ and $A_3$ is converted in an associated analogue-to-digital converter 34, and formed into a pulse train compatible with the input requirements of a printing counter 35. The analogue-to-digital conversion is performed in such a way that the repetition rate of the pulses is a direct function of the output voltage from the amplifiers $A_1$, $A_2$ and $A_3$.

The two resultant digital outputs from each amplifier caused by each cell performing alternately the function of short path and long path detector are counted and the time integral is obtained.

The photocells 8 and 8' associated with the amplifier $A_1$, receive light that has passed through a filter specific for the transmission of ultraviolet rays in the region of the spectrum absorbed by organic matter in the sample, together with a filter specific for the rejection of the region of the spectrum absorbed by nitrate ions. The resultant output from the amplifier $A_1$ will therefore relate to the organic matter within the sample. The photocells 9 and 9' associated with the amplifier $A_2$ are also sensitive in the ultraviolet region but do not have a filter specific to the wavelength absorbed by nitrate ions, and therefore the output of the amplifier $A_2$ is related to the presence of nitrate ions in the sample as well as organic matter. Hence by comparing one with the other the amount of nitrate ions present can be determined. The photocells 10 and 10' associated with the amplifier $A_3$ are visible light-sensitive detectors and are not associated with any filters, so that the output from the amplifier $A_3$ will give an indication of the amount of particulate suspended matter in the sample.

It is apparent that any suspended matter will affect the first two measurements in such a way as to give a high output from the amplifiers $A_1$ and $A_2$, but correction is made for this effect by applying to the two amplifiers concerned a proportion of the output from the third amplifier $A_3$, using another operational amplifier $A_4$ as a phase inverter to ensure correct polarity.

The proportion of the output of the amplifier $A_3$ required to be applied to the amplifiers $A_1$ and $A_2$ to compensate for the presence of suspended solid matter in the sample is determined by the actual parameters of the amplifiers $A_1$, $A_2$ and $A_3$ and can be determined by means of an initial calibration with samples containing known amounts of suspended solid matter.

Similarly, a proportion of the output from the amplifier $A_1$ corresponding to the concentration of nitrate ions in the sample is applied to the amplifier $A_2$ so that the output from the amplifier $A_2$ is corrected for both suspended matter and organic matter. The amplifier $A_5$ is used in a similar manner to the amplifier $A_4$ to ensure correct polarity.

As explained already the method of measurement involves counting digital pulses from a pair of photocells over a preset time interval, then changing the roles of the photocells and illuminating the changed photocells by the second light source and repeating the counting process, eventually summing the two counts and printing their total. Having made one count it is necessary to immobilise the amplifiers $A_1$, $A_2$ and $A_3$ while the respective input photocells are changed over, and the source shutters 12, 12' are moved one position so that the photocells receive light from the other light source. This is achieved by closing a relay 36 that operates respective switches 36 that are situated between the input and output of the amplifiers $A_1$, $A_2$ and $A_3$ so that the amplifier gains are made to be zero for the interval during which the shutters are operated and the photocells are changed over by another relay 37.

When this action is completed the feedback relay 36 is opened and the next counting sequence can begin.

At the end of the second counting period the amplifier $A_1$, $A_2$ and $A_3$ are immobilized once more while a change over is made to the third channel, and during this period the total count over the first two periods is printed out on the counter 35. The counter 35 is electrically reset to zero and the next channel is selected. By means of a delay circuit 38 the photocell relay 37 is operated a short time after the feedback relay 36 so that should any contact bounce occur in the photocell relay 37 it will occur during the immobilized period and therefore does not lead to any spurious counts being recorded. When the counting and printing cycles of all three channels have been completed the electrical supplies are switched off by a control circuit 39 and are energized later by the same control circuit when it is required to record a further sequence. The control circuit 39 also operates the printer 35 and gates 40 that are associated with respective counting channels. The gates 40 prevent spurious pulses that may occur in any channel affecting the counting of pulses occurring in any selected channel.

FIG. 4 shows an alternative arrangement which consists of a rectangular cell 41 which has an inlet passage 42 and an outlet passage 43 so that a sample liquid can be caused to flow through the cell 41. Symmetrically positioned in the cell 41 are two low-pressure mercury vapor light sources 44 and 44' corresponding to the light sources 3, 3' shown in FIG. 1. Two detectors 45 and 45' are so mounted on side walls of the cell 41 that they are positioned symmetrically with respect to the light sources 44 and 44' and receive light from the light sources 44 and 44' which has travelled over a longer or a shorter path through the sample liquid, the longer and shorter paths being the same for each detector, as before. The detectors 45 and 45' contain three photocells P1, P2 and P3 and P4, P5 and P6 respectively. The photocells are paired as before and operate in a like manner to provide three sets, or channels, for signals, the first consisting of photocells P1, P4, providing signals indicative of the concentration of organic matter in the sample, the second consisting of photocells P2, P5, providing signals indicative of the concentration of organic matter and nitrates, or nitrate ion in the sample, and the third pair of photocells, P3, P6, providing a signal indicative of the amount of suspended solid matter in the sample.

The light sources 44 and 44' emit both visible and ultraviolet light and are switched on and off alternately at a frequency of 50 $H_2$ to transpose the functions of the pairs of photocells. The photocells P1, P4 and P2, P5 consist of silicon photo-voltaic cells associated with a filter, of a type known under the Trade Mark Chance 0X7, which transmits ultraviolet radiation only and is coated with a red phosphor, thus making the silicon photo-voltaic cells responsive to ultraviolet radiation. In addition to the above described filter, the photocells P1 and P4 have an additional filter provided by a cell containing a strong solution of sodium nitrate. Therefore, the outputs of the photocells P1 and P4 are indicative of dissolved organic matter only, whereas the outputs of photocells P2 and P5 are indicative of the concentration of nitrates or nitrate ion in addition to that of dissolved organic matter. Because solid matter suspended in the sample attenuates light generally over the spectrum, the photocells P3 and P6 are arranged to respond to visible light, that is, they do not have filters associated with them.

A further arrangement is shown in FIG. 5. In this case, a rectangular cell 51 has an inlet 52 and an outlet 53 so arranged that the flow of sample through the cell is along the major axis of the cell 51. Light sources 54 and 54' identical to those used in the arrangement described with reference to FIG. 4 are positioned at one end of the cell 51. Two detectors 55 and 55' are symmetrically positioned with respect to the longer axis of the cell 51 and the light sources 54, 54', so that light can reach them via longer or shorter paths through the sample liquid. In this case, however, the detectors 55, 55' contain only two photocells each, P1, P2 and P4, P5 respectively. The photocells P3 and P6 which generate a signal indicative of the amount of suspended solid matter in the sample are positioned at the further end of the cell 51.

A diaphragm 56 having an axial hole 57 divides the cell 51 and is such that light from the source 54 can reach the photocell P6 directly and light from the source 54 can reach the photocell P3 directly. The other photocell in each case can only receive light which has been scattered in the sample liquid. The concentration of suspended solid matter is measured by measuring the ratio of transmitted to scattered light.

Figure 6:
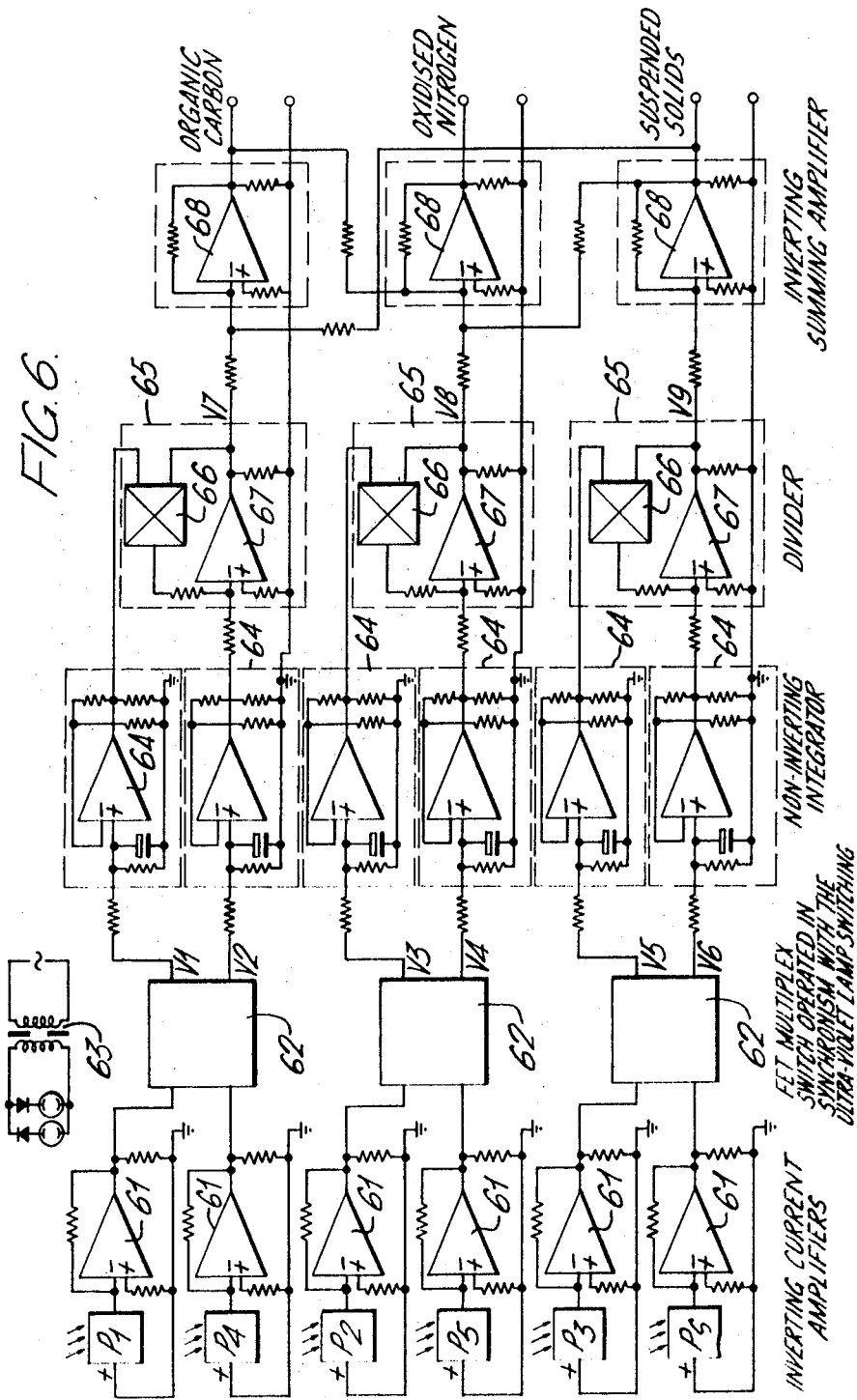
FIG. 6 shows a circuit diagram of an alternative monitoring apparatus for use in embodiments of the invention.

Referring to FIG. 6, the output from each photocell is applied to a respective operational amplifier 61 before being applied in respective pairs to changeover switches 62 which are operated in synchronism with the switching of the light sources by the circuit 63. The result is that six pulsed voltages V1, V2, V3, V4, V5 and V6 are produced each corresponding to the output of a respective photocell. Of these voltages, V1, V3 and V5 are indicative of attenuations over the longer path through the sample and V2, V4 and V6 are indicative of attenuations over the shorter path through the sample. The voltages V1, V2, V3, V4, V5 and V6 are integrated by means of noninverting integrating circuits 64 to produce steady signal levels and the ratio of appropriate pairs of voltages is obtained by dividing circuits 65, each of which consists of a solid state multiplier module 66 connected as a feedback element in an inverting amplifier circuit 67. The resulting output voltages V7, V8 and V9 are independent of changes in the intensity of the light emitted by the sources 44, 44' and 54, 54' and are independent of fouling, both uniform and otherwise, of optical surfaces.

The voltages V7, V8 and V9 a logarithmic function of the light absorbed by the sample. The voltage V7 is a measure of the attenuation due to organic carbon and nitrates, or nitrate ion, dissolved in the sample; the voltage V8 is a measure of the attenuation due to nitrates, or nitrate ion, dissolved in the sample; and the voltage V9 is a measure of the attenuation due to the suspended solids content of the sample.

A proportion of the voltage V9 is fed back in opposition to voltages V7 and V8 to correct these for the effect of the suspended solid matter. The corrected voltages (V7 − kV9); (V8 − kV9) and the voltage V9 are summed individually by inverting summing amplifiers 68 to provide final output signal levels. The final output voltage corresponding to $V_8$, that is, oxidized nitrogen in the form of nitrates or nitrate ion, is subtracted from the final output voltage corresponding to V7 to provide a signal indicative of dissolved carbon only.

Thus three analogue signals are provided indicative of the concentrations of organic carbon; oxidized nitrogen in the form of nitrates or nitrate ion; and the suspended solids content of the sample.

The above described monitoring circuit is also applicable to the form of cell shown in FIG. 5, but in this case, an extra element is required to reverse the sign of V9.

If desired, the analogue signals can be converted to a digital form and applied to a print out and control system similar to that shown in FIG. 3.

I claim:

1. Apparatus for measuring the optical density of a fluid for light having wavelengths in a specific region of the electromagnetic spectrum comprising:

first and second detecting means for each receiving light which has travelled through a sample of the fluid over both longer and shorter light paths, means associated with each detecting means for directing a light beam into said sample so as to travel along said longer path to the associated detector and for directing another light beam into said sample so as to travel along said shorter path to the associated detector, means for deriving from the detectors a first signal related to the attenuation of light, means for deriving from the detectors a second signal related to the concentration of solid matter suspended in the fluid, and means for utilizing the second signal to correct the first signal and thereby provide an output signal indicative of the optical density of the fluid.

2. Apparatus as claimed in claim 1, wherein each detecting means comprises a plurality of photocells, corresponding pairs of photocells from each detecting means being adapted to respond to light having wavelengths within a predetermined range of wavelengths.

3. A method of measuring the optical density of a fluid for light having wavelengths in a specific region of the electromagnetic spectrum comprising the steps of:

deriving a first signal related to the attenuation of the light, including directing beams of the light along longer and shorter paths through the fluid to first and second detector means, causing each of the detecting means alternately to receive light which has travelled along the longer or shorter path and deriving from signals generated by the said first and second detecting means a signal related to the amount of light received by each of the detectors via the longer and shorter paths to provide said first signal, deriving a second signal related to the concentration of solid matter suspended in the fluid, and utilizing the second signal to correct the first signal for attenuation of the light by the suspended solid matter and thereby to provide an output signal indicative of the optical density of the fluid.

4. Apparatus for measuring the optical density of a fluid for light having wavelengths in a specific region of the electromagnetic spectrum comprising:

means for deriving a first signal related to the attenuation of the light, means for deriving a second signal related to the concentration of solid matter suspended in the fluid, means for utilizing the second signal to correct the first signal for attenuation of the radiation by the said suspended solid matter and thereby provide an output signal indicative of the optical density of the fluid means for directing beams of the light along longer and shorter paths through a sample of the fluid to first and second detecting means, means for causing each of the detecting means alternately to receive light which has travelled along the longer or shorter paths through the fluid and means for generating a signal related to the ratio of the intensity of the radiation received by each of the detecting means via the longer path to the intensity of the radiation received via the shorter path to provide the signal related to the attenuation of the radiation when travelling through the fluid which in addition is relatively insensitive to variations in the incident radiation and detector characteristics.

5. Apparatus according to claim 4 wherein the arrangement is such that when one detecting means is receiving light which has travelled over the longer path, simultaneously the other is receiving light which has travelled over the shorter path and for each detecting means the total radiation received via each of the said paths in a given time interval, is utilized to provide the signal related to the attenuation of the radiation.

6. Apparatus according to claim 4 wherein each detecting means includes a plurality of photocells, corresponding pairs of photocells from each detecting means being adapted to respond to light having wavelengths within a predetermined range of wavelengths.

7. Apparatus for measuring the optical density of a fluid for light having wavelengths in a specific region of the electromagnetic spectrum comprising:
   means for deriving a first signal related to the attenuation of the light and for deriving a second signal related to the concentration of solid matter suspended in the fluid including first and second detecting means each including a plurality of photocells corresponding pairs of photocells from each detecting means being adapted to respond to light having wavelengths within a predetermined range of wavelengths,
   means for utilizing the second signal to correct the first signal for attenuation of the radiation by the said suspended solid matter and thereby provide an output signal indicative of the optical density of the fluid, and
   a plurality of operational amplifiers, each operational amplifier having a photocell from one detecting means connected as a feedback resistive element so that the gain of each of the operational amplifiers is related to the ratio of the intensities of the light incident upon its associated photocells to provide a first signal related to the attenuation of the light.

8. Apparatus according to claim 7 wherein one of the pairs of photocells is utilized to produce the said second signal, and at least a proportion of the said second signal is applied to each of the operational amplifiers associated with the remaining pairs of photocells to correct the first signal generated by that amplifier for attenuation of the radiation by the said suspended solid matter.

9. Apparatus according to claim 8 including an analogue-to-digital converter connected to each of the said operational amplifiers and arranged to provide a train of output pulses the repetition frequency of which is a direct function of the output voltage from the operational amplifier.

10. Apparatus according to claim 9 including means for counting said output pulses over a predetermined time interval.

11. Apparatus for measuring the optical density of a fluid for light having wavelengths in a specific region of the electromagnetic spectrum comprising:
   means for deriving a first signal related to the attenuation of the light and for deriving a second signal related to the concentration of solid matter suspended in the fluid including first and second detecting means each including a plurality of photocells corresponding pairs of photocells from each detecting means being adapted to respond to light having wavelengths within a predetermined range of wavelengths,
   means for utilizing the second signal to correct the first signal for attenuation of the radiation by the said suspended solid matter and thereby provide an output signal indicative of the optical density of the fluid, and
   an operational amplifier associated with each photocell, a plurality of changeover switches to which signals generated by respective pairs of photocells are applied, means for operating said changeover switches in synchronism with means for energizing alternately first and second light sources so arranged that one photocell in each pair receives light from one light source via the shorter path and the other light source via the longer path, the longer and shorter paths being equal for each photocell, means for integrating the signals generated by the said operational amplifiers, and means for determining for each pair of photocells the ratio of the integrated signals due to light travelling via the longer path to the integrated signals due to light travelling via the shorter path to provide the first signal related to the attenuation of the radiation.

12. Apparatus according to claim 11 wherein one of said pairs of photocells is utilized to provide said second signal and at least a proportion of said second signal is combined with each of the said first signals to provide the output signal indicative of the optical density of the fluid.

13. A cell for use in apparatus according to claim 4 comprising a chamber for containing a sample liquid, means for positioning first and second light sources within the chamber, means for so mounting first and second detecting means that each detector means can receive light from one of the light sources via a longer path and from the other light source via a shorter path, the longer and shorter paths being the same for each detector.

14. A cell for use in apparatus according to claim 4 comprising an elongated chamber for containing a liquid sample, means for mounting first and second light sources at one end of the chamber, means for so mounting first and second detector means that each detector can receive light from one source via a longer path and from the other light source via a shorter path, the longer and shorter paths being the same for each detector, means for mounting third and fourth detector means at the end of the cell remote from the light sources, a diaphragm dividing the cell and having an orifice, the third and fourth detectors and the orifice being so positioned that the third detector can receive light directly only from one light source and the fourth detector can receive light directly only from the other light source.

15. Apparatus for measuring the optical density of a fluid for light having wavelengths in a specific region of the electromagnetic spectrum comprising:
   first and second detecting means each including a plurality of photocells, corresponding pairs of photocells from each detecting means being arranged to respond to light having wavelengths within a predetermined range,
   means for directing beams of light through a sample of the fluid to said first and second detecting means so that each of said detecting means receives light which has travelled along both longer and shorter light paths through the fluid sample,
   means for deriving from a first corresponding pair of photocells in the first and second detecting means a first signal related to the attenuation of the light by its passage through the sample,
   means for deriving from a second pair of corresponding photocells in the first and second detecting means a second signal related to the concentration of solid matter suspended in the fluid sample, and
   means for utilizing the second signal to correct the first signal for attenuation of the light by the said suspended solid matter and thereby to provide an output signal indicative of the optical density of the fluid.

16. Apparatus as claimed in claim 15 and including an operational amplifier having one photocell from said first corresponding pair of photocells connected as an input resistive element and the other photocell of the pair connected as a feed back resistive element so that the gain of the operational amplifier is related to the ratio of the intensities of light incident upon the said first pair of photocells to provide the first signal related to the attenuation of light.

17. Apparatus as claimed in claim 16 further including means for applying at least a proportion of said second signal to said operational amplifier so as to correct the first signal generated by said amplifier for attenuation of the light by the said suspended solid matter.

18. Apparatus as claimed in claim 17 further including a chamber for containing a sample liquid, means for positioning first and second light sources within the chamber, means for mounting said first and second detecting means so that each detecting means receives light from one of the light sources via a longer path and from the other light source by a shorter path, the longer and shorter paths being the same for each detector.

19. Apparatus for measuring the optical density of a fluid for light having wavelengths in a specific region of the electromagnetic spectrum, comprising:
   first and second detecting means, means for directing beams of light along longer and shorter paths through a sample of the fluid to the first and second detecting means, means for causing each of the detecting means alternately to receive light which has travelled along the longer or shorter paths, means for deriving from the first and second detecting means a first signal related to the attenuation of the light by its passage through the fluid, means for deriving from the first and second detecting means a second signal related to the concentration of solid matter suspended in the fluid, means for utilizing the second signal to correct the first signal for attenuation of the light by the said suspended matter and thereby to provide an output signal indicative of the optical density of the fluid.

20. Apparatus as claimed in claim 19 wherein each detecting means includes a plurality of photocells, corresponding pairs of photocells from each detecting means being adapted to respond to light having wavelengths within a predetermined range of wavelengths and wherein the arrangement is such that when one detecting means is receiving light which has travelled over the longer path, simultaneously the other is receiving light which has travelled over the shorter path and for each detecting means the total radiation received via each of the said paths in a given time interval is utilized to provide the signal related to the attenuation of the radiation.

21. Apparatus as claimed in claim 20 including an operational amplifier having one photocell from a first corresponding pair of photocells connected as an input resistive element and the other photocell of the pair connected as a feed back resistive element so that the gain of the operational amplifier is related to the ratio of the intensities of light incident upon the said first pair of photocells to provide the first signal related to the attenuation of light and means for alternately interchanging the functions of said pair of photocells in synchronism with the means for causing each of the detecting means alternately to receive light which has travelled along the longer or shorter paths.

* * * * *